(12) United States Patent
Yu et al.

(10) Patent No.: US 12,536,072 B2
(45) Date of Patent: Jan. 27, 2026

(54) METHOD, DEVICE, AND COMPUTER PROGRAM PRODUCT FOR ADJUSTING DATA PLACEMENT

(71) Applicant: Dell Products L.P., Round Rock, TX (US)

(72) Inventors: Chark Wenshuai Yu, Shanghai (CN); Lu Lei, Shanghai (CN); Jiang Cao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 10 days.

(21) Appl. No.: 18/591,916

(22) Filed: Feb. 29, 2024

(65) Prior Publication Data

US 2025/0225031 A1 Jul. 10, 2025

(30) Foreign Application Priority Data

Jan. 5, 2024 (CN) .......................... 202410023481.1

(51) Int. Cl.
*G06F 11/10* (2006.01)
*G06F 11/14* (2006.01)

(52) U.S. Cl.
CPC ........ *G06F 11/141* (2013.01); *G06F 11/1016* (2013.01)

(58) Field of Classification Search
CPC ............................ G06F 11/141; G06F 11/1016
See application file for complete search history.

(56) References Cited

U.S. PATENT DOCUMENTS

| 12,174,845 | B1* | 12/2024 | Gordon | G06F 11/1458 |
| 2014/0351636 | A1* | 11/2014 | Yin | G06F 11/2094 |
| | | | | 714/15 |
| 2017/0004044 | A1* | 1/2017 | Tormasov | G06F 11/1076 |
| 2023/0236932 | A1* | 7/2023 | Yamamoto | G06F 11/1076 |
| | | | | 714/6.24 |

* cited by examiner

*Primary Examiner* — Philip Guyton
*Assistant Examiner* — Sean Kevin Mcnamara
(74) *Attorney, Agent, or Firm* — Amin, Turocy & Watson, LLP (57) ABSTRACT

Data placement is adjusted. For instance, it is determined whether a node Failure To Tolerate (FTT) of a chunk in a storage system meets an optimized node FTT corresponding to the chunk, and, when it is determined that it does not meet, an FTT task entry for the chunk is added to a chunk index of the storage system. The added FTT task entry includes an identifier of the chunk, its node FTT, and the corresponding optimized system node FTT. Furthermore, instead of scanning placement information for each chunk, the storage system may adjust, based on the FTT task entry in the chunk index, placement of blocks of the corresponding chunk in system nodes. Therefore, the need to scan the placement information of all chunks and calculate their node FTTs in rebalance operations and minimum node FTT queries is eliminated, thereby improving the performance of the storage system.

20 Claims, 6 Drawing Sheets

METHOD, DEVICE, AND COMPUTER PROGRAM PRODUCT FOR ADJUSTING DATA PLACEMENT

RELATED APPLICATION

The present application claims the benefit of priority to Chinese Patent Application No. 202410023481.1, filed on Jan. 5, 2024, which application is hereby incorporated into the present application by reference herein in its entirety.

TECHNICAL FIELD

Embodiments of the present disclosure relate to storage technologies, and more particularly, to a method, a device, and a computer program product for adjusting data placement in a storage system.

BACKGROUND

In a storage system, data may be divided into chunks for storage. A chunk may include a plurality of physical blocks. In a distributed storage system that includes a plurality of nodes, these blocks may be placed on different nodes and provide a certain degree of data redundancy, so that the chunk can tolerate failures of a certain number of nodes. In other words, even if up to this number of nodes fail, data of the chunk can still be recovered.

For a distributed storage system, data availability is one aspect of a service level agreement (SLA) for customers, which may be reflected in a node Failure To Tolerate (FTT). A node FTT for a chunk indicates the number of faulty nodes that the chunk can tolerate. Due to the specific placement of its blocks within nodes, different chunks in the storage system may have different node FTTs.

SUMMARY

Embodiments of the present disclosure provide a solution for adjusting data placement.

In a first example embodiment of the present disclosure, a method for adjusting data placement is provided, including: determining whether a node Failure To Tolerate (node FTT) of a first chunk in a storage system meets an optimized node FTT corresponding to the first chunk, wherein the storage system includes a plurality of nodes and the first chunk includes a plurality of blocks; adding, in response to the node FTT not meeting the optimized node FTT, a first FTT task entry for the first chunk to a chunk index of the storage system, wherein the first FTT task entry includes an identifier of the first chunk, the node FTT, and the optimized system node FTT; and adjusting placement of the plurality of blocks in the plurality of nodes based on the first FTT task entry.

In a second example embodiment of the present disclosure, an electronic device is provided. The electronic device includes a processor and a memory that is coupled to the processor and has instructions stored therein. The instructions, when executed by the processor, cause the device to execute actions including: determining whether a node FTT of a first chunk in a storage system meets an optimized node FTT corresponding to the first chunk, wherein the storage system includes a plurality of nodes and the first chunk includes a plurality of blocks; adding, in response to the node FTT not meeting the optimized node FTT, a first FTT task entry for the first chunk to a chunk index of the storage system, wherein the first FTT task entry includes an identifier of the first chunk, the node FTT, and the optimized system node FTT; and adjusting placement of the plurality of blocks in the plurality of nodes based on the first FTT task entry.

In a third example embodiment of the present disclosure, a computer program product is provided. The computer program product is tangibly stored on a computer-readable medium and includes machine-executable instructions. The machine-executable instructions, when executed, cause a machine to perform a method comprising a method comprising determining whether a node Failure To Tolerate (node FTT) of a first chunk in a storage system meets an optimized node FTT corresponding to the first chunk, wherein the storage system comprises a plurality of nodes and the first chunk comprises a plurality of blocks; adding, in response to the node FTT not meeting the optimized node FTT, a first FTT task entry for the first chunk to a chunk index of the storage system, wherein the first FTT task entry comprises an identifier of the first chunk, the node FTT, and the optimized system node FTT; and adjusting placement of the plurality of blocks in the plurality of nodes based on the first FTT task entry.

It should be noted that this Summary is provided to introduce a selection of concepts in a simplified manner, which will be further described in the Detailed Description below. The Summary is neither intended to identify key features or major features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent, where.

In all the drawings, the same or similar reference numerals represent the same or similar elements.

DETAILED DESCRIPTION

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." Relevant definitions of other terms will be given in the description below.

As used herein, depending on the context, a value "meeting a threshold" may, depending on the context, refer to the value being greater than the threshold, greater than or equal to the threshold, equal to the threshold, less than or equal to the threshold, less than the threshold, and the like.

In a storage system, data may be divided into chunks for storage, and each of the chunks includes a plurality of physical blocks on a storage disk. As a result, the chunk may be physically stored on different storage nodes and provide a certain degree of data redundancy. In this way, when up to a certain number of nodes fail, the data of the chunk can be recovered. The number of faulty nodes that a chunk can tolerate is called a node FTT, which can reflect the availability of data in the storage system and is a notable aspect of SLA for customers.

Due to different placements of each chunk in a plurality of nodes, different chunks in the storage system may have different node FTTs. In addition, the storage system may use a plurality of types of chunks to store data, and each type of chunk has a specific structure. For example, according to different sources, purposes, and sizes of the data, the storage system may store the data as different types of chunks. Because different types of chunks may have different structures, different types of chunks can achieve different optimal node FTTs in the same system.

When a node FTT of a chunk is lower than an optimal FTT it can achieve, the storage system may perform a rebalance operation on it. The rebalance operation replaces blocks of the chunk to distribute the blocks more evenly among the nodes of the storage system. The storage system may use a chunk index to perform the operation. The chunk index may, for example, be a lookup table or other appropriate data structures. Information of a chunk may be stored in a corresponding entry of the chunk index, and the information may include positions of various blocks of the chunk in the storage system and their corresponding health statuses (such as whether the nodes where the blocks are located are faulty).

In a conventional storage system, in order to perform the rebalance operation, it is necessary to scan all entries of chunks in the chunk index and calculate a node FTT of a chunk based on the placement of the chunk and the health statuses of the blocks. If the calculated node FTT is lower than the corresponding optimal node FTT, the storage system will attempt to rebalance the blocks of the chunk to positions as evenly distributed as possible among nodes. Such global scanning needs to be performed repeatedly, and the node FTT needs to be calculated for each chunk, so the overhead is high and the efficiency is limited.

On the other hand, when performing maintenance operations on nodes such as disk replacement, temporary node downtime, or node removal, as a security check item before performing the operations, the storage system needs to check whether the minimum node FTT of current chunks in the system meets the data availability requirement, so as to determine whether maintenance can be performed on the nodes and/or how many nodes can be maintained. However, global scanning for all chunks takes a lot of time, and it is impossible to quickly return the accurate minimum node FTT.

Some storage systems determine whether the data availability requirement is met by checking whether there is a repair task entry in the chunk index. As a non-restrictive example, it is set that when a chunk cannot tolerate the failure of at least one node, a repair task entry for the chunk is added to the chunk index. In this case, if there is a repair task in the chunk index, the minimum node FTT is zero, and a maintenance operation is not allowed. If there is no repair task, a maintenance operation on a node can be performed. However, this manner is not perfect. For example, in the above example, if there is no repair task, the storage system cannot determine whether the minimum node FTT of the system is greater than one, and thus cannot perform a maintenance operation on more than one node.

To at least partially solve the above problems and other potential problems, the embodiments of the present disclosure provide a solution for adjusting data placement. When determining that a node FTT of a chunk in a storage system does not meet an optimized node FTT corresponding to the chunk (for example, an optimal node FTT based on the number of nodes and a chunk structure, or an optimized value considering additional constraints), the solution adds an FTT task entry for the chunk to a chunk index in the storage system. The added FTT task entry includes an identifier of the chunk, its node FTT, and the corresponding optimized system node FTT. Furthermore, instead of scanning placement information for each chunk, the storage system may adjust, based on the FTT task entry in the chunk index, placement of a plurality of blocks of the corresponding chunk in a plurality of nodes of the system.

In this way, chunks of which the node FTTs need to be improved may be tracked, so that the storage system can efficiently perform rebalance operations on blocks of these chunks. The solution eliminates the need during the rebalance operation to repeatedly scan the placement information of all chunks and calculate their node FTTs, thereby improving the performance of the storage system. In addition, in some embodiments, based on tracking of the node FTTs, the minimum node FTT for the chunks can be quickly obtained through query.

The embodiments of the present disclosure will be described below in further detail with reference to the accompanying drawings. First, referring to FIG. 1, which shows a schematic diagram of an example environment 100 in which a plurality of embodiments of the present disclosure can be implemented. The environment 100 includes an example storage system, and the example storage system includes a plurality of storage nodes 110-1, 110-2, . . . , and 110-K (individually or collectively referred to as a node 110). Each storage node 110 includes one or a plurality of storage disks (not shown), and may include services and processes for storing and managing data on the disks. The data stored on the node 110 may include user data and system metadata. In the storage system, data may be divided into chunks for storage. A chunk includes a plurality of physical blocks that may be stored on different nodes. For example, blocks 120-1, 120-2, . . . , and 120-L (individually or collectively referred to as a block 120) may be a plurality of blocks of the same chunk.

Figure 1:
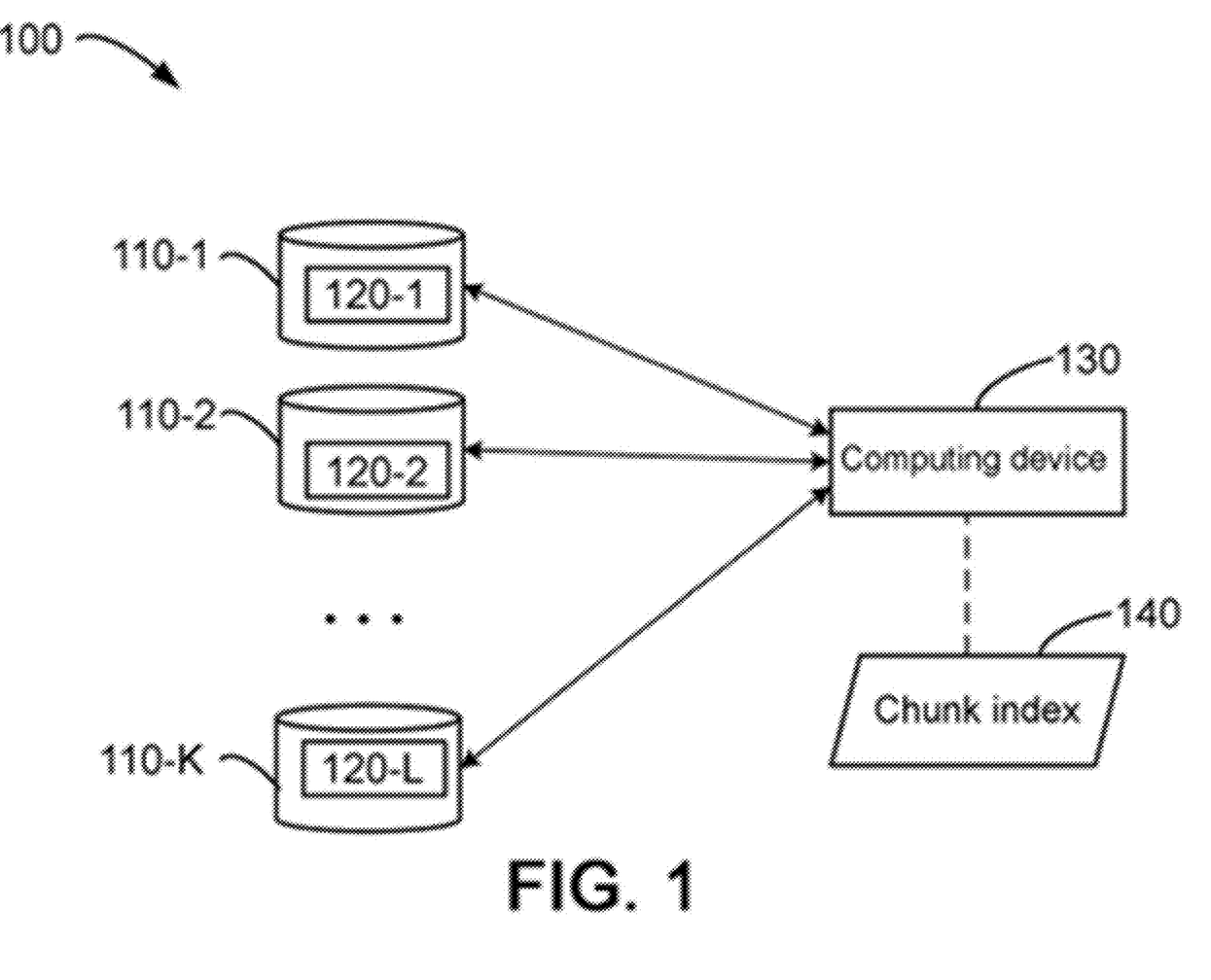
FIG. 1 shows a schematic diagram of an example environment in which one or more example embodiments of the present disclosure can be implemented.

A computing device 130 is also shown in FIG. 1. The computing device 130 may be a control device of the storage system and may perform various actions according to the embodiments of the present disclosure. Although the computing device 130 is shown as a single entity for clarity of illustration, the computing device 130 may be present and distributed in any suitable form. For example, the computing device 130 may include a plurality of centralized or distributed devices, or may be a virtual device. For example, the computing device 130 may exist as a separate control node or may be located on one or a plurality of nodes within the node 110. The scope of the present disclosure is not limited by the specific form of the computing device 130. The computing device 130 may communicate with other entities in the environment 100 to facilitate execution of various operations. For example, the computing device 130 may send data and instructions to processes on the node 110 to control storage, movement, and retrieval of the data on the node 110.

In the storage system, a plurality of types of chunks may be used to store data, and each type of chunk may have a specific structure and a corresponding optimal node FTT. In some embodiments, one type of chunk may be based on a plurality of mirror copies. This type of chunk may include N (for example, 3) blocks, where each block stores a mirror copy of the same data. Each copy is stored on a different node, so that the chunk can tolerate up to N−1 node failures, that is, its optimal node FTT is N−1. For the sake of clarity, this type of chunk is referred to as a regular chunk below. For example, this type of chunk may be used for storing system metadata in the storage system.

In some embodiments, the storage system may utilize the erasure coding (EC) technology to enhance data availability. The EC mode of m+n supports using a specific algorithm to calculate n check blocks for m raw blocks, thereby obtaining encoded m+n blocks. Any m blocks out of the m+n blocks can be used to calculate all raw data. Therefore, one copy of EC data includes m raw blocks and n check blocks. For example, in a storage system utilizing the EC technology, user data may be stored based on an EC-mode chunk type. For the sake of ease of description, such chunk is referred to as an EC chunk below.

In some such embodiments, one type of EC chunk (hereinafter referred to as a first-type EC chunk) may include one copy of EC data and N−1 mirror copies of raw data. For example, this type of EC chunk may include m raw blocks and n check blocks, as well as N−1 mirror copies of the m raw blocks. For example, this type of chunk may be used to write small-sized data multiple times. For example, during each write, the computing device 130 may write data to m raw blocks on one or a plurality of nodes 110, and simultaneously write N−1 copies of the data to another N−1 sets of m blocks, respectively. In this way, before the m raw blocks can be erasure-coded, mirror copies may be used to enhance the availability of the data.

In addition, when the m raw blocks are fully written, the computing device 130 may encode them to compute and write n check blocks to the one or a plurality of nodes 110, thereby obtaining an EC copy of the data. Furthermore, after the encoding is completed, the storage system may delete N−1 mirror copies of the N−1 pieces of raw data of the chunk, thereby converting the chunk into another type of block (hereinafter referred to as a second-type EC chunk). The second-type EC chunk includes an EC data copy of m+n blocks.

In some embodiments, when writing large data that may fill m blocks, the storage system may also directly use the second-type EC chunk to store the data. In this case, the storage system directly writes m raw blocks and encodes them, without using the first-type EC chunk for transition.

An optimal FTT of the encoded EC chunk depends on the number of available nodes in the storage system and an EC mode used. For example, for a storage cluster that includes at least m+n available nodes and uses the EC mode of m+n, when the encoded EC chunk has the best placement, each block in an EC data copy of the chunk can be placed in a different node. Therefore, in the storage cluster, the optimal node FTT of the encoded EC chunk is equal to n. In a practical implementation, for example, the storage cluster includes less than m+n available nodes, and therefore, the optimal node FTT of the encoded EC chunk may be less than m.

To track information related to a chunk, the computing device 130 may maintain a chunk index 140, for example, in the form of one or a plurality of tables. The chunk index 140 may store an entry about placement of the chunk, which records positions and health statuses of various blocks of the corresponding chunk on the node 110.

For illustration purposes, the chunk index 140 is shown as a separate entity associated with the computing device 130, but it should be understood that this is only a logical schematic representation. Depending on the implementation, the chunk index 140 may be centrally or distributedly stored in a plurality of storage positions of the storage system. For example, as part of the storage system metadata, a plurality of copies of the chunk index 140 may also be distributed across a plurality of nodes 110. The embodiment of the present disclosure is not limited by the physical storage position of the chunk index 140.

The computing device 130 may process the placement of chunks on the node 110 and maintain their block statuses (for example, using a chunk manager implemented on it). For example, the computing device 130 may create various types of chunks and distribute their blocks among the nodes 110. For example, the computing device 130 may encode an EC chunk. The successful creation of a regular chunk based on N mirror copies requires the block to be able to tolerate N−1 node failures. On the other hand, when the encoded EC chunk can tolerate at least one node failure, its data does not need to be recovered.

In addition, if a node in the node 110 fails, health statuses of blocks stored on the node will become poor. The chunk that owns these blocks may still have the best placement, but some blocks are lost, resulting in a decrease in the node FTT of these chunks. Therefore, the computing device 130 may perform a recovery action for the chunk.

For example, the computing device 130 may change a block status in the chunk index and create a repair task for the affected chunk when the node 110 or its disk fails. The repair task may also be recorded in the chunk index. For example, for a regular chunk, the computing device 130 may reconstruct lost blocks by copying its remaining available mirror copies. For example, for an encoded EC chunk, the computing device 130 may use its remaining available blocks to perform erasure code decoding, so as to recover lost blocks. When the recovered regular chunk can tolerate N−1 node failures, or the encoded EC chunk can tolerate at least one node failure, the computing device 130 may remove the repair task entry.

For a specific chunk, a node FTT of the specific chunk may be lower than an optimal FTT that can be achieved by the type of chunk it belongs to, as its blocks may not be in optimal placement in the node. In addition, as mentioned above, the recovered chunk may not be in the optimal placement status, so its node FTT can be improved by adjusting the placement of its blocks. For example, an EC chunk that has been encoded or recovered may just tolerate at most one node failure, but depending on the number of nodes in the storage system and the mode used by the EC chunk, the chunk should be able to tolerate more node failures after its placement is optimized. In this regard, the computing device 130 may also rebalance the physical placement of the chunk among nodes according to the embodiment of the present disclosure, as described in more detail below.

The architecture and functions in the example environment 100 are described only for illustrative purposes, without implying any limitation to the scope of the present disclosure. There may also be other devices, systems, or components that are not shown in the example environment 100. For example, there may be a plurality of clients in the example environment for users' use to access the storage system. In addition, the embodiments of the present disclosure may also be applied to other environments having different structures and/or functions.

Figure 2:
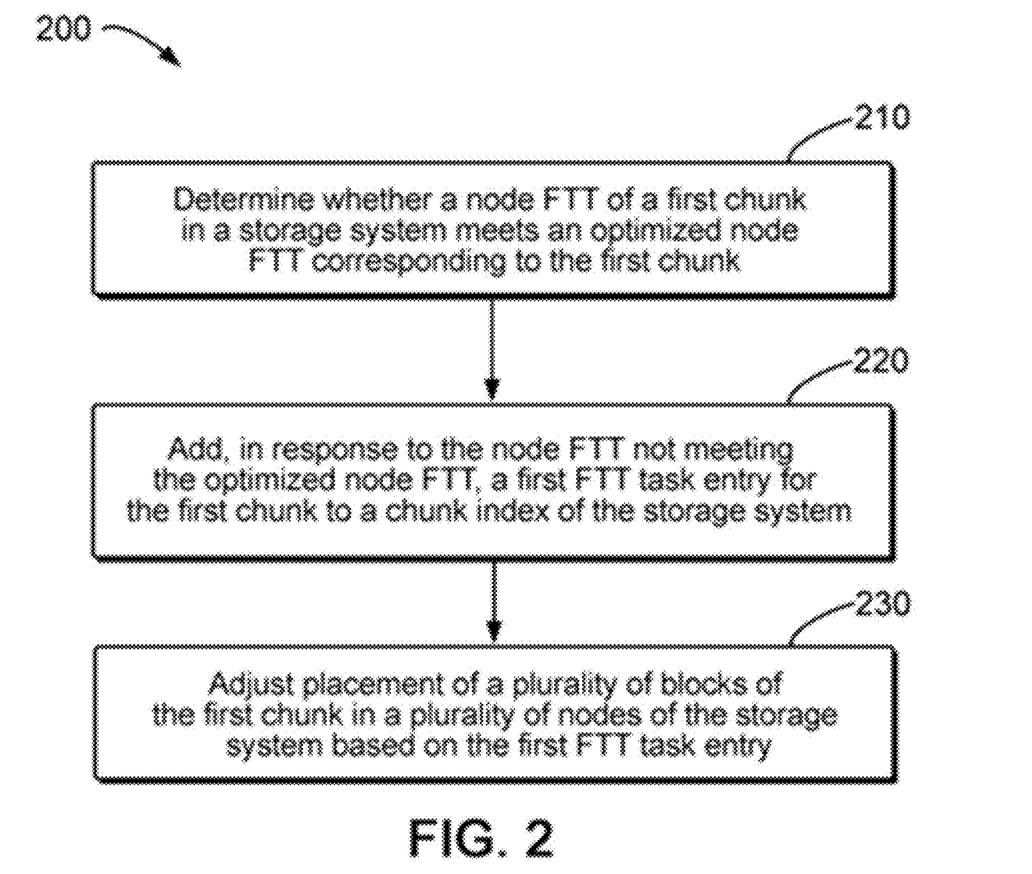
FIG. 2 shows an example method for adjusting data placement according to some example embodiments of the present disclosure.

FIG. 2 shows a flow chart of an example method 200 for adjusting data placement according to some embodiments of the present disclosure. The example method 200 may be performed by, for example, the computing device 130 as shown in FIG. 2. It should be understood that the method 200 may also include additional actions not shown, and the scope of the present disclosure is not limited in this regard. The method 200 will be described in detail below with reference to the example environment 100 in FIG. 1.

At 210, it is determined whether a node FTT of a first chunk in a storage system meets an optimized node FTT corresponding to the first chunk. The storage system includes a plurality of nodes, and the first chunk includes a plurality of blocks. For example, the computing device 130 may determine whether a node FTT of a chunk stored in the storage system in FIG. 1 meets an optimized node FTT corresponding to the chunk.

In some embodiments, the storage system may store a plurality of types of chunks, and an optimized node FTT corresponding to a specific chunk corresponds to the type of the chunk. For example, the computing device 130 may use the optimal node FTT that a certain type of chunk can achieve in the storage system as the optimized node FTT for the type of chunk.

For example, as shown in the foregoing with reference to FIG. 1, an optimized node FTT for a regular chunk based on N copies may be N−1, and an optimized node FTT for an encoded EC chunk based on an m+n mode may be n when the number of nodes is sufficient. In some embodiments, the computing device 130 may also consider additional limiting factors on the basis of the optimal node FTT to determine the optimized node FTT for a practical application. The optimized node FTT for a corresponding type may be recorded, for example, in metadata of the storage system.

The computing device 130 may perform a determination action of 210 when creating, encoding, and repairing blocks or when the node 110 changes, as described in more detail later with reference to FIG. 3A to FIG. 3F. In some embodiments, based on block placement and health status recorded by 110 in a chunk index regarding the first chunk, the computing device 130 may determine the node FTT of the first chunk, thereby determining whether the node FTT meets the corresponding optimized node FTT.

At 220, in response to the node FTT not meeting the optimized node FTT, a first FTT task entry for the first chunk is added to the chunk index of the storage system. For example, in response to determining at 210 that the current node FTT of a certain chunk does not meet (for example, is lower than) its corresponding optimized node FTT, the computing device 130 may add an FTT task entry for the chunk to the chunk index 140.

The FTT task entry for the first chunk includes an identifier of the first chunk, its node FTT, and an optimized system node FTT corresponding to the first chunk. In some embodiments, the FTT task entry may be implemented as a part of an entry for the chunk in the chunk index 140. In some embodiments, the FTT task entry may be stored as a separate list to facilitate scanning for the FTT task entry. It will be understood by those skilled in the art that other various implementations of the FTT task entry may also be adopted in specific implementations.

As a non-restrictive example, the FTT task entry may be stored as a key value pair in the chunk index 140. The key may include the identifier of the corresponding chunk and the node FTT of the chunk. The value may include the optimized FTT corresponding to the chunk. This type of entry indicates that a rebalance action should be performed on the corresponding chunk, so that its node FTT is improved as much as possible to the optimized FTT recorded in the entry.

At 230, placement of a plurality of blocks of the first chunk in a plurality of nodes in the storage system is adjusted based on the first FTT task entry. For example, the computing device 130 may adjust, based on the FTT task entry for the chunk, the placement of the plurality of blocks of the chunk in the plurality of nodes in the storage system.

In some embodiments, the computing device 130 may adjust the placement of the plurality of blocks of the chunk in the node 110 in a way that improves the node FTT of the chunk. For example, the computing device 130 may place various blocks of the chunk on as many nodes 110 as possible. In this way, the chunk is distributed more uniformly and dispersedly, and thus can tolerate more node failures.

If the improved node FTT meets (reaches) the optimized node FTT corresponding to the chunk, it may be considered that the FTT task for the chunk is completed. In this case, the computing device 130 may remove the corresponding FTT task entry from the chunk index 140. In some embodiments, after the rebalance action is performed on the chunk, the node FTT of the chunk may still not meet the optimized node FTT. In this case, the computing device 130 may update the node FTT of the chunk in the entry and keep the entry in the chunk index 140.

In some embodiments, the computing device 130 may scan the chunk index 140 to search for an FTT task entry for a chunk in the storage system. If an FTT task entry (for example, the first FTT task entry mentioned above) is detected during scanning, the computing device 130 may perform a rebalance action on the chunk targeted by the FTT task entry according to the entry, that is, adjust placement of a plurality of blocks of the chunk in various storage nodes. In this way, the computing device 130 does not need to repeatedly scan physical placement information of all chunks and health statuses of various blocks. Instead, the computing device 130 can implement an FTT task scanning function and perform a corresponding chunk rebalance action based on the FTT task entry found through the scanning, as well as stop scanning when there is no FTT task entry in the chunk index 140.

By using the method 200, the chunk of which the node FTT needs to be improved may be tracked, so that the storage system can efficiently perform a rebalance operation on blocks of the corresponding chunk. The solution eliminates the need to scan the placement information of all chunks and calculate their node FTTs in rebalance operations and minimum node FTT queries, thereby saving computational resources for balancing data placement in the storage system and improving the performance of the storage system.

In some embodiments, when creating a chunk, the computing device 130 may determine whether the node FTT meets an optimized node FTT corresponding to the chunk, and add a corresponding FTT task entry to the chunk index when the node FTT does not meet the optimized node FTT. For example, if an optimized node FTT for an encoded EC chunk is n, and a node FTT for a created second-type EC chunk is less than n, the computing device 130 may add an FTT task entry for the EC chunk.

In some embodiments, when EC encoding is performed on the first-type EC chunk to write computing check blocks, the computing device 130 may determine whether the FTT of the encoded chunk is smaller than the optimized node FTT for the EC chunk. If so, the computing device may add an FTT task entry for the EC chunk.

In some embodiments, changes regarding the node 110 may occur in the storage system, such as the addition, removal, and temporary shutdown of the nodes. Node changes may cause changes in the optimized node FTTs for chunks. For example, the EC chunk may be able to tolerate more or fewer node failures at most due to changes in node data. In some such embodiments, the computing device 130 may implement a scanning function for checking FTTs to scan all chunks and update the FTT task entry accordingly when needed. The scanning function may monitor available nodes that can place blocks and a target node FTT for the storage system.

The target node FTT reflects an expected number of node failures that all chunks in the storage system can tolerate at least. The target node FTT may be determined based on the number of nodes in the storage system and the EC mode used by its EC chunk, and it meets the following rules:

the target node FTT≥1;
the optimal node FTT for the encoded EC chunk≥the target node FTT; and
the optimal node FTT for the regular chunk=N−1≥the target node FTT.

According to the above relationship, all chunks in the storage system are designed to be able to tolerate at least a certain degree of node failure, and the optimal node FTT that each specific type of chunk can achieve may be higher than the target node FTT. The optimal node FTT of the regular chunk depends on the number N of mirror copies in the chunk, while the optimal number of nodes of the encoded EC chunk depends on the EC mode it uses (that is, the number m of blocks and the number n of check blocks) and the number of available nodes in the storage system.

In some such embodiments, in response to the addition of a new node to the storage system, the computing device 130 may determine whether there is a change in an optimized node FTT of a certain type of chunk in the storage system. If such change exists, the computing device 130 may update the FTT task entry for the chunk in the chunk index 140 based on the change. Otherwise, the computing device 130 may not perform related actions.

FIG. 3A to FIG. 3F show non-restrictive simplified examples according to some embodiments of the present disclosure, and show a plurality of scenarios of node changes in a storage system, where actions according to the embodiments of the present disclosure may be performed in the scenarios. In the example, the optimal node FTT that a specific type of chunk can achieve in the storage system is used as the optimized node FTT for the type. The storage system shown in FIG. 3 may be an example implementation of the storage system in FIG. 1. The example of FIG. 3A to FIG. 3F may be described below with reference to the environment 100 in FIG. 1.

Figure 3A:
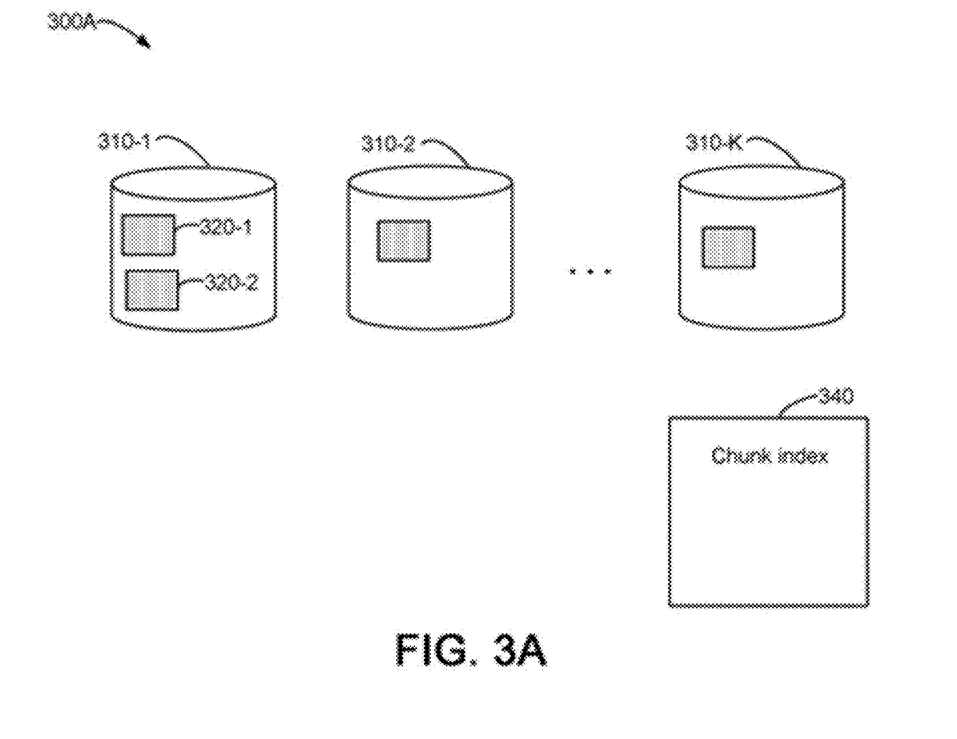
FIG. 3A to FIG. 3F show non-restrictive simplified examples according to some example embodiments of the present disclosure, wherein actions according to the example embodiments of the present disclosure can be performed in a scenario of the example.

As shown in FIG. 3A, in a scenario 300A, nodes 310-1 to 310-K (individually or collectively referred to as a node 310) of a storage system including K available nodes are shown, and K=m+n−1. In addition, the storage system uses an EC chunk in m+n mode to store data. In this case, a plurality of blocks in an EC copy of an encoded EC chunk must have at least two blocks located on the same node, for example, as shown by blocks 320-1 and 320-2 on the node 310-1. In this way, in the storage system, the optimized node FTT for the EC chunk cannot achieve n supported by the EC mode.

FIG. 3A further shows a chunk index 340 of the storage system, which may be an example implementation of the chunk index 140 in FIG. 1. Assuming that other blocks of a chunk where blocks 320-1 and 320-2 are located have been evenly distributed on other nodes 310 of the storage system. The chunk is in the best placement that can currently be achieved, and therefore, there is no FTT task entry for the chunk in the chunk 340. For the sake of clear illustration, entries for other types of the chunk and entries for other chunks in the chunk index 340 are omitted in FIG. 3A to FIG. 3F.

Figure 3B:
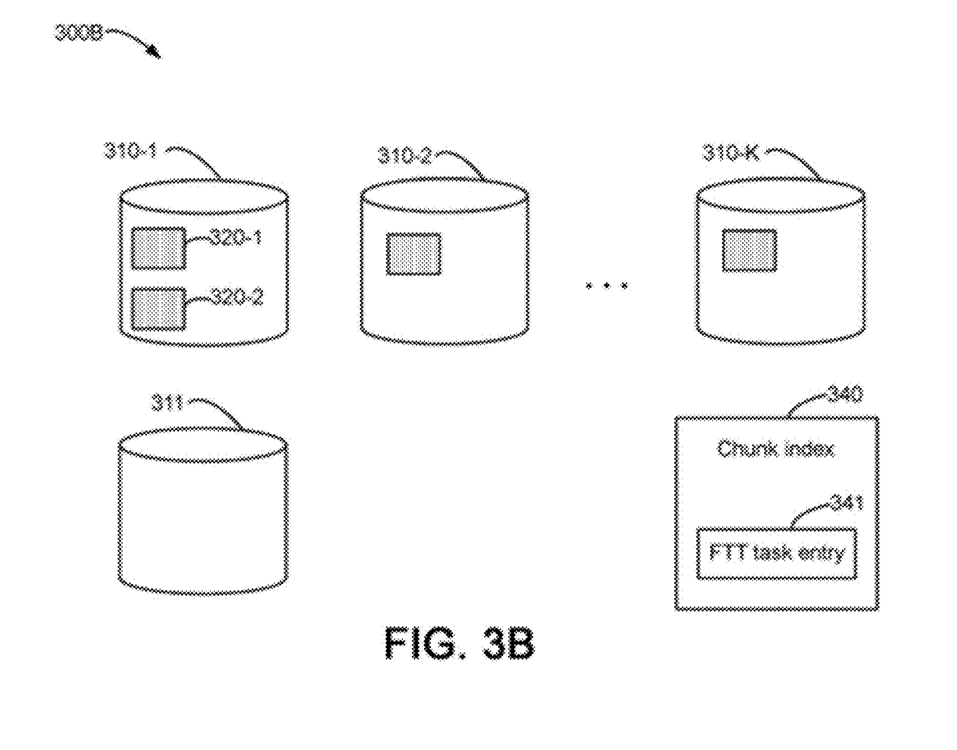

Later, as shown in FIG. 3B, in a scenario 300B, a new node 311 is added to the storage system. In response to the addition of the node, the computing device 130 may detect that the addition of the node increases the number of available nodes to m+n. In this way, the storage system can support placing each block in the EC copy of the encoded EC chunk on a different node. Therefore, the addition of the node 311 will increase the optimized node FTT for the encoded EC chunk to n.

In response to the detection that the addition of the node 311 changes the optimized node FTT mentioned above, the computing device 130 may scan all chunks to check their node FTTs. If it is detected that the node FTT of a chunk does not meet the corresponding updated optimal node FTT, the computing device 130 may add an FTT task entry for the chunk to the chunk index 340, where the FTT task entry includes an identifier and node FTT of the chunk, as well as the updated optimized FTT corresponding to the chunk. For example, the computing device 130 may further update information in the existing FTT task entries in the chunk index based on checks.

Furthermore, the computing device 130 may utilize the FTT task scanning function as described above to scan for the FTT task entry in the chunk index 340, and perform a corresponding FTT task based on the FTT task entry obtained through the scanning, such as a rebalance action for the corresponding chunk. For example, the blocks 320-1 and 320-2 are located on the same node, and therefore, the computing device 130 will detect that the node FTT of the EC chunk where they are located is less than n. Therefore, the FTT task entry 341 for the EC chunk is added to the chunk index 340.

Figure 3C:
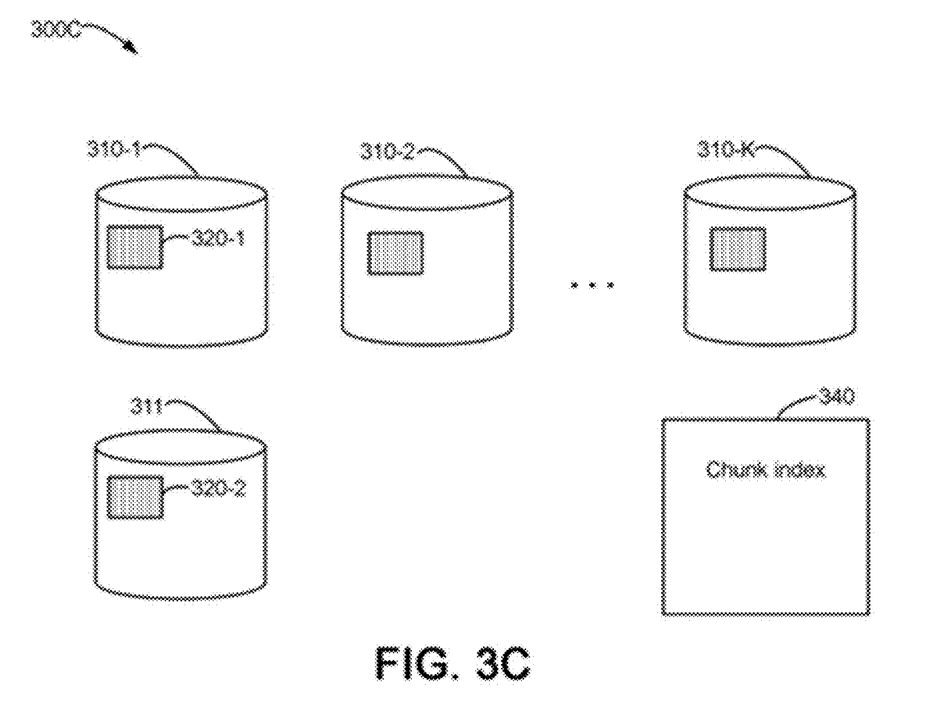

The computing device 130 may then adjust physical distribution of the chunk based on the FTT task entry 341, for example, in response to its FTT scanning function detecting the FTT task entry 341. As shown in 3C, in a scenario 300C, the computing device 130 may replace the block 320-2 onto the newly added node 311. As mentioned earlier, other blocks in the EC chunk have already been distributed on different nodes 310. After replacement, the node FTT of the chunk reaches n. Therefore, the computing device 130 may remove the FTT task entry 341 from the chunk index 340.

Figure 3D:
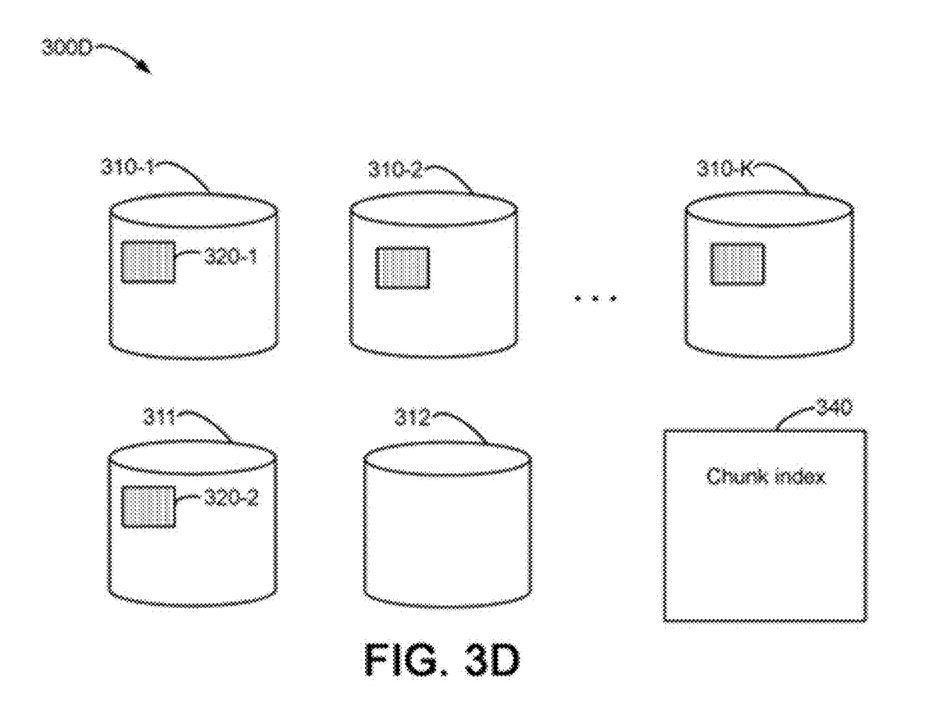

For example, due to a node's full storage space or other reasons, as shown in FIG. 3D, in a scene 300D, another node 312 may also be added to the storage system later. However, the addition of the node 312 will not further improve the optimized node FTT for the chunk, and therefore, the computing device 130 does not need to scan all chunks after such node is added.

Similarly, the removal of a node may also change the optimized FTT for the chunk, for example, reducing the optimized FTT. In addition, the removal of a node makes blocks located on the node unavailable, and therefore they need to be recovered. In some embodiments, in response to a node being removed from the storage system, the computing device 130 may perform recovery of data in the storage system. For example, the computing device 130 may update statuses of various blocks to determine the chunk that needs to be recovered, and add a repair task for it (for example, as a repair task entry in the chunk index 340) and execute the task. As mentioned earlier with reference to FIG. 1, the computing device 130 may recover data in a corresponding manner based on the type of the chunk.

After the data recovery is completed, the computing device 130 may remove the repair task. Furthermore, the computing device 130 may update the FTT task entry for the chunk in the chunk index based on the placement of the recovered data on a plurality of nodes. For example, the computing device 130 may determine whether the removal of a node changes the optimized FTT for the chunk, and scan the chunk to check whether its node FTT meets the changed optimized FTT. Based on the check, the computing device 130 may add an FTT task entry accordingly, remove the corresponding FTT task entry when the node FTT of the chunk meets the changed optimized FTT, or may update information of the FTT task entry.

Figure 3E:
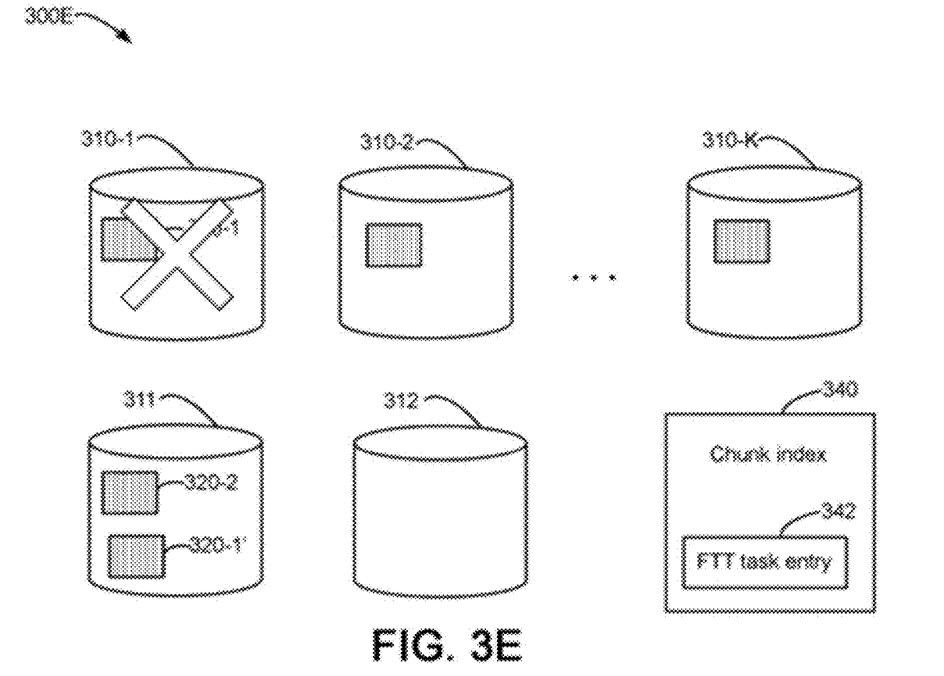

As shown in FIG. 3E, in a scenario 300E, a node 310-1 is removed from the storage system, resulting in the loss of a block 320-1 of the EC chunk. Therefore, the computing device 130 may calculate the value of the block 320-1 based on other chunks in the EC chunk, thereby recovering it. In the example, the recovered block 320-1' is first placed on the node 311, so that the node FTT of the EC chunk where it is located is lower than n.

Figure 3F:
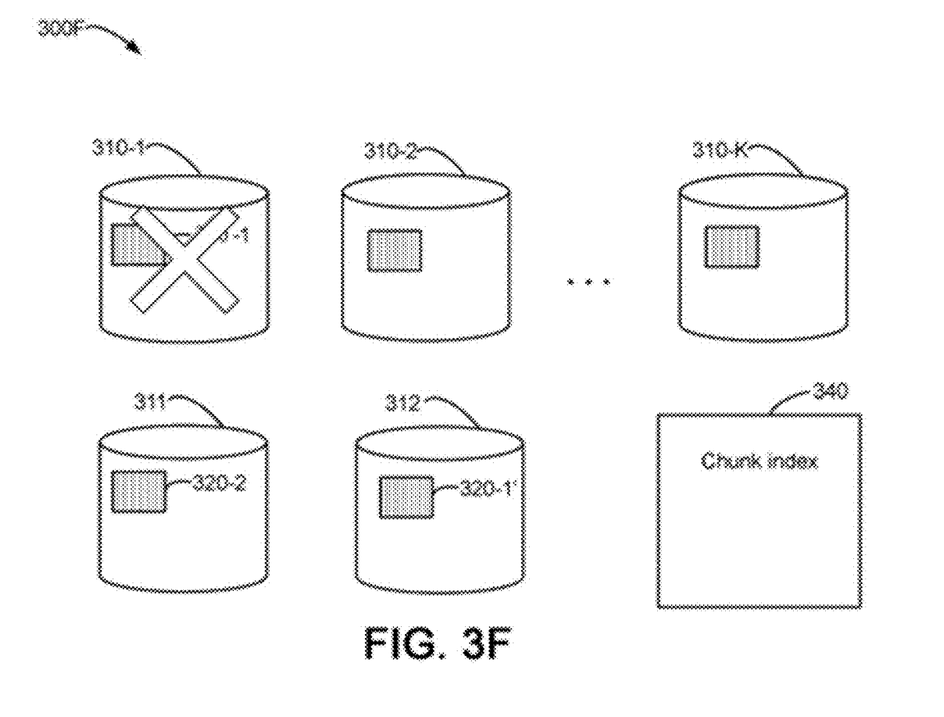

On the other hand, due to the previous addition of the node 312, the storage system still has m+n nodes, so that the optimized FTT for the EC chunk is still n. Therefore, the computing device 130 will detect that the node FTT of the chunk needs to be improved and add an FTT task entry 342 to the chunk index 340. After executing the corresponding FTT task, as shown in FIG. 3F, in a scenario 300F, the block 320-1' is replaced at the node 312, resulting in the optimal distribution of the chunk. Then, the computing device 130 may remove the FTT task entry 342.

In some embodiments, a user may temporarily invalidate a node (for example, offline) so as to perform various maintenance actions. Such temporary failure may also cause a change in the optimized FTT of the node. The changed optimized FTT may affect decision-making on various operations during node invalidation. Therefore, in response to performing the action that temporarily invalidates a node in the storage system, the computing device 130 may update the optimized node FTT for the type of chunk in the storage system based on the conditions of other nodes. If the computing device 130 determines that the temporary invalidation does not change the optimized node FTT, its value may be kept unchanged. In addition, the temporarily invalidated node will be online again later, the data on it is not actually lost. Therefore, the computing device 130 will not scan the chunk to update statuses of its blocks, so as to avoid an unnecessary data recovery operation.

Based on the node FTT recorded in the FTT task entry, the minimum node FTT of the chunk in the storage system may be quickly obtained through query. The minimum node FTT can reflect the number of nodes in the storage system on which the maintenance operation can be safely performed currently. Therefore, the computing device 130 may quickly determine whether the maintenance operation to be performed on the node 110 is safe.

In some embodiments, the computing device 130 may receive a query for the minimum value of the node FTT of a chunk in the storage system. In response to receiving the query, the computing device determines the minimum value based on at least one of the following: The optimized node FTTs for various types of chunks in the storage system, such as the target node FTT for the storage system as mentioned earlier, and FTT task entries for the chunks in the chunk index.

In some embodiments, the computing device 130 may determine a value that ensures the safety of maintenance actions as the minimum value. For example, in an example implementation, if it is determined that the action of scanning chunk node FTTs has not been completed, the computing device 130 may determine the minimum value as 0 when there is a repair task; otherwise, the minimum value is 1.

Furthermore, in this example, if the aforementioned scanning action has been completed, but an update process of the block status caused by a node failure or other reasons has not yet been completed, then an actual FTT value of the chunk is not yet clear. In this case, the computing device 130 may check whether there is any FTT task entry in the chunk index.

If an FTT task entry exists, the computing device 130 may take 0 as the safe minimum node FTT value. That is, a maintenance operation should not be performed on the node at this time, as it cannot be guaranteed that the storage system can tolerate a node failure at this time. If no FTT task entry exists, the computing device 130 may take a larger value of the following two as the minimum node FTT value: 0, or a value of subtracting the number of faulty nodes from the target node FTT.

In addition, in the example implementation, if the scan for FTTs has been completed and statuses of the blocks have been updated, the computing device 130 may also check whether there is an FTT task entry in the chunk index. If an FTT task entry exists, the computing device 130 may take the smaller value of the following two as the minimum node FTT value: the target node FTT, or the minimum node FTT value recorded in the FTT task entry. If no FTT task entry exists, the computing device 130 may take the target node FTT as the minimum node FTT value.

Figure 4:
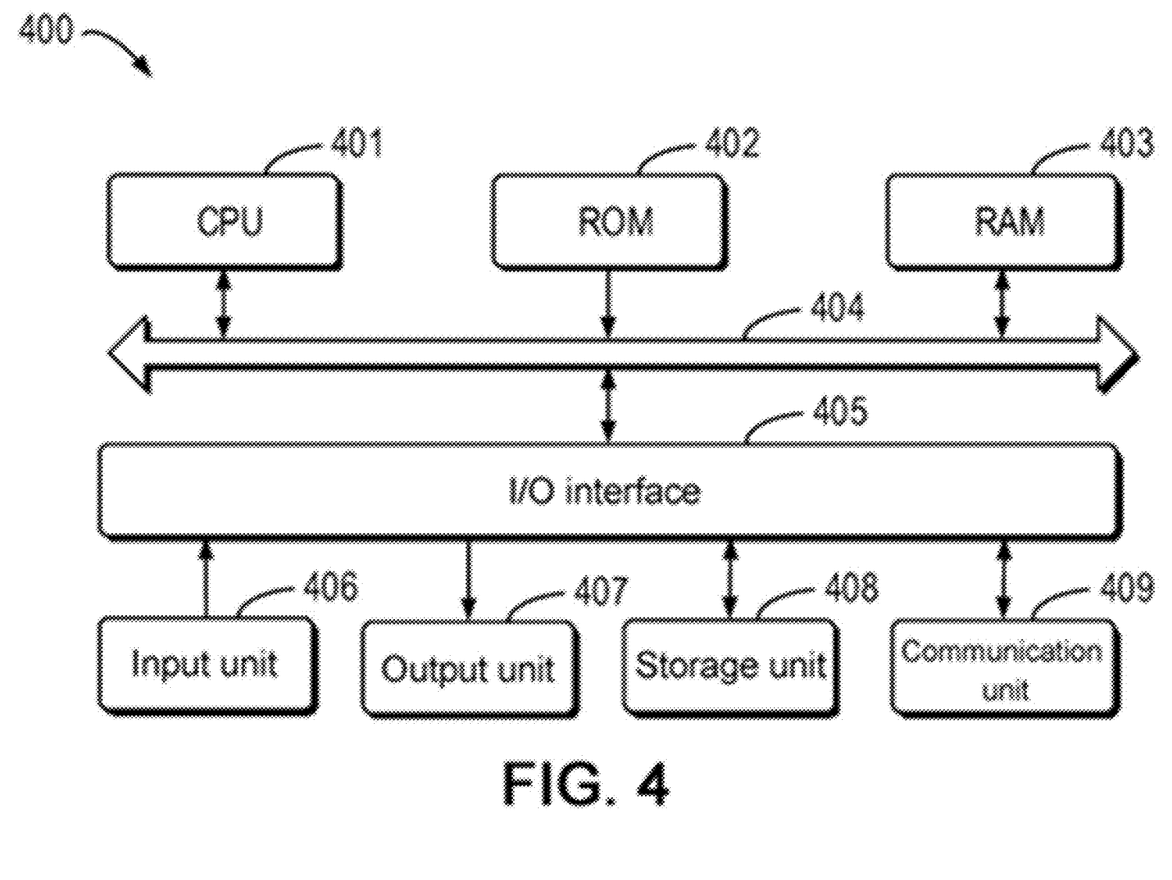
FIG. 4 shows a schematic block diagram of a device that can be configured to implement example embodiments of the present disclosure.

FIG. 4 shows a schematic block diagram of a device 400 that may be configured to implement embodiments of the present disclosure. The device 400 may be a device or an apparatus as described in the embodiments of the present disclosure. As shown in FIG. 4, the device 400 includes a central processing unit (CPU) 401 which may perform various appropriate actions and processing according to computer program instructions stored in a read-only memory (ROM) 402 or computer program instructions loaded from a storage unit 408 to a random access memory (RAM) 403. The RAM 403 may further store various programs and data required by operations of the device 400. The CPU 401, the ROM 402, and the RAM 403 are connected to each other through a bus 404. An input/output (I/O) interface 405 is also connected to the bus 404. Although not shown in FIG. 4, the device 400 may further include a co-processor.

A plurality of components in the device 400 are connected to the I/O interface 405, including: an input unit 406, such as a keyboard and a mouse; an output unit 407, such as various types of displays and speakers; the storage unit 408, such as a magnetic disk and an optical disc; and a communication unit 409, such as a network card, a modem, or a wireless communication transceiver. The communication unit 409 allows the device 400 to exchange information/data with other devices via a computer network, such as the Internet, and/or various telecommunication networks.

The various methods or processes described above may be performed by the processing unit 401. For example, in some embodiments, the method may be embodied as a computer software program that is tangibly included in a machine-readable medium, such as the storage unit 408. In some embodiments, part of or all the computer program may be loaded and/or installed onto the device 400 via the ROM 402 and/or the communication unit 409. When the computer program is loaded into the RAM 403 and executed by the CPU 401, one or more steps or actions of the methods or processes described above may be executed.

In some embodiments, the methods and processes described above may be implemented as a computer program product. The computer program product may include a computer-readable storage medium on which computer-readable program instructions for performing various embodiments of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various example embodiments of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various example embodiments of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

The embodiments of the present disclosure have been described above. The foregoing description is illustrative rather than exhaustive, and is not limited to the embodiments disclosed. Numerous modifications and alterations are apparent to those of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

What is claimed is:

1. A method, comprising:
   determining, by a system comprising at least one processor, whether a node Failure To Tolerate (node FTT) of a chunk in a storage system meets an optimized node FTT corresponding to the chunk, wherein the storage system comprises nodes and the chunk comprises blocks, wherein the node FTT indicates a first number of node failures that the chunk is able to tolerate before being associated with data loss, and wherein the optimized node FTT indicates a second number of node failures for which the chunk is able to be configured based on a third number of the nodes and an erasure coding schema of the system;
   adding, in response to the node FTT being determined not to meet the optimized node FTT, a FTT task entry for the chunk to a chunk index of the storage system, wherein the FTT task entry comprises an identifier of the chunk, the node FTT, and the optimized system node FTT; and
   adjusting placement of the blocks in the nodes based on the FTT task entry to increase the first number of node failures that the chunk is able to tolerate before being associated with data loss.

2. The method according to claim 1, wherein adjusting the placement of the blocks in the nodes based on the FTT comprises:
   adjusting the placement of the blocks in a way that a performance of the node FTT according to a defined performance criterion, resulting in an improved node FTT; and
   removing the FTT task entry from the chunk index in response to the improved node FTT being determined to meet the optimized node FTT.

3. The method according to claim 1, wherein adjusting the placement of the blocks based on the FTT task entry comprises:
   scanning the chunk index to search for the FTT task entry for the chunk; and
   adjusting the placement of the blocks in response to determining that the FTT task entry is detected during scanning.

4. The method according to claim 1, wherein the storage system stores types of chunks, and wherein the optimized node FTT corresponding to a corresponding chunk corresponds to a type of the corresponding chunk.

5. The method according to claim 4, further comprising:
   determining, in response to addition of a new node to the storage system, whether there is a change in the optimized node FTT for the type of the chunk in the storage system; and
   updating, in response to determining that the change exists, the FTT task entry for the chunk in the chunk index based on the change.

6. The method according to claim 4, further comprising:
   performing, in response to a node being removed from the storage system, recovery of data in the storage system; and
   updating, after the recovery is completed, the FTT task entry for the chunk in the chunk index based on the placement of the recovered data on the nodes.

7. The method according to claim 4, further comprising:
   updating, in response to performing an action of temporarily invalidating a node of the nodes, the optimized node FTT for the type of the chunk in the storage system based on other nodes in the nodes.

8. The method according to claim 1, further comprising:
   receiving a query, wherein the query targets a minimum value of the node FTTs for chunks in the storage system; and
   determining, in response to the query, the minimum value based on at least one of:
   the optimized node FTTs for types of the chunks in the storage system,
   a target node FTT for the storage system, or
   FTT task entries for the chunks in the chunk index.

9. A device, comprising:
   at least one processor; and
   at least one memory coupled to the at least one processor, wherein the memory has instructions stored therein, and the instructions, when executed by the processor, cause the device to perform actions comprising:
   determining whether a node Failure To Tolerate (node FTT) of a chunk in a storage system meets an optimized node FTT corresponding to the chunk, wherein the storage system comprises a group of nodes and the chunk comprises a group of blocks, wherein the node FTT indicates a first number of node failures that the chunk is able to tolerate before being associated with data loss, and wherein the optimized node FTT indicates a second number of node failures for which the chunk is able to be configured based on a third number of the nodes and an erasure coding schema of the system;
   adding, in response to the node FTT not meeting the optimized node FTT, a FTT task entry for the chunk to a chunk index of the storage system, wherein the FTT task entry comprises an identifier of the chunk, the node FTT, and the optimized node FTT; and
   adjusting placement of the group of blocks in the group of nodes based on the FTT task entry to increase the first number of node failures that the chunk is able to tolerate before being associated with data loss.

10. The device according to claim 9, wherein adjusting the placement of the group of blocks in the group of nodes based on the FTT comprises:
    adjusting the placement of the group of blocks in a way that improves the node FTT according to a defined improvement criterion, the adjusting resulting in an improved node FTT; and
    removing the FTT task entry from the chunk index in response to the improved node FTT meeting the optimized node FTT.

11. The device according to claim 9, wherein adjusting the placement of the group of blocks based on the FTT task entry comprises:
scanning the chunk index to search for the FTT task entry for the chunk; and
adjusting the placement of the group of blocks in response to determining that the FTT task entry is detected during scanning.

12. The device according to claim 9, wherein the storage system stores a group of types of chunks, and wherein the optimized node FTT corresponding to a corresponding chunk corresponds to a type of the corresponding chunk.

13. The device according to claim 12, wherein the actions further comprise:
determining, in response to addition of a new node to the storage system, whether there is a change in the optimized node FTT for the type of the chunk in the storage system; and
updating, in response to the existence of the change, the FTT task entry for the chunk in the chunk index based on the change.

14. The device according to claim 12, wherein the actions further comprise:
performing, in response to a node being removed from the storage system, recovery of data in the storage system; and
updating, after the recovery is completed, the FTT task entry for the chunk in the chunk index based on the placement of the recovered data on the group of nodes.

15. The device according to claim 12, wherein the actions further comprise:
updating, in response to performing an action of temporarily invalidating a node of the group of nodes, the optimized node FTT for the type of the chunk in the storage system based on other nodes in the group of nodes.

16. The device according to claim 9, wherein the actions further comprise:
receiving a query, wherein the query targets a minimum value of the node FTTs for chunks in the storage system; and
determining, in response to the query, the minimum value based on at least one of the following:
the optimized node FTTs for types of the chunks in the storage system,
a target node FTT for the storage system, and
FTT task entries for the chunks in the chunk index.

17. A computer program product tangibly stored on a non-transitory computer-readable medium and comprising machine-executable instructions, wherein the machine-executable instructions, when executed, cause a machine to perform operations, comprising:
determining whether a node Failure To Tolerate (node FTT) of a first chunk in a storage system meets an optimized node FTT corresponding to the first chunk, wherein the storage system comprises a plurality of nodes and the first chunk comprises a plurality of blocks, wherein the node FTT indicates a first number of node failures that the chunk is able to tolerate before being associated with data loss, and wherein the optimized node FTT indicates a second number of node failures for which the chunk is able to be configured based on a third number of the nodes and an erasure coding schema of the system;
adding, in response to the node FTT being determined not to satisfy the optimized node FTT, a first FTT task entry for the first chunk to a chunk index of the storage system, wherein the first FTT task entry comprises an identifier of the first chunk, the node FTT, and the optimized node FTT; and
adjusting placement of the plurality of blocks in the plurality of nodes based on the first FTT task entry to increase the first number of node failures that the chunk is able to tolerate before being associated with data loss.

18. The computer program product according to claim 17, wherein adjusting the placement of the plurality of blocks in the plurality of nodes based on the FTT comprises:
adjusting the placement of the plurality of blocks to increase a performance metric associated with the node FTT; and
removing the first FTT task entry from the chunk index in response to the improved node FTT being determined to satisfy the optimized node FTT.

19. The computer program product according to claim 18, wherein adjusting the placement of the plurality of blocks based on the first FTT task entry comprises:
scanning the chunk index to search for an FTT task entry for the chunk; and
adjusting the placement of the plurality of blocks in response to determining that the first FTT task entry is detected during scanning.

20. The computer program product according to claim 17, wherein the storage system stores a plurality of types of chunks, and wherein the optimized node FTT corresponding to a corresponding chunk corresponds to a type of the corresponding chunk.

* * * * *